United States Patent
Kozlov

(10) Patent No.: US 11,262,639 B2
(45) Date of Patent: Mar. 1, 2022

(54) APPARATUS AND METHODS FOR UPCONVERSION OF A MILLIMETER-WAVE SIGNAL AND DETECTION OF THE UPCONVERTED SIGNAL

(71) Applicant: Microtech Instruments, Inc., Lorton, VA (US)

(72) Inventor: Vladimir G. Kozlov, Lorton, VA (US)

(73) Assignee: Microtech Instruments, Inc., Lorton, VA (US)

( * ) Notice: Subject to any disclaimer, the term of this patent is extended or adjusted under 35 U.S.C. 154(b) by 0 days.

(21) Appl. No.: 17/221,763

(22) Filed: Apr. 2, 2021

(65) Prior Publication Data

US 2021/0311371 A1    Oct. 7, 2021

Related U.S. Application Data

(60) Provisional application No. 63/004,711, filed on Apr. 3, 2020.

(51) Int. Cl.
  *G02F 1/35*   (2006.01)
  *G02F 1/225*  (2006.01)
  *H04B 10/2507* (2013.01)

(52) U.S. Cl.
  CPC .......... *G02F 1/3534* (2013.01); *G02F 1/2257* (2013.01); *H04B 10/2507* (2013.01)

(58) Field of Classification Search
  None
  See application file for complete search history.

(56) References Cited

U.S. PATENT DOCUMENTS 4,897,562 A    1/1990  Krasinski et al.
5,623,145 A    4/1997  Nuss
(Continued)

FOREIGN PATENT DOCUMENTS

JP    2004-020504     1/2004
WO    WO 2003/042670  5/2003

OTHER PUBLICATIONS

F. Tekavec, V. G. Kozlov, I. McNee, Y. Lee and K. Vodopyanov, "Real time THz imaging based on frequency upconversion," 2015 40th International Conference on Infrared, Millimeter, and Terahertz waves (IRMMW-THz), 2015, pp. 1-1, doi: 10.1109/IRMMW-THz. 2015.7327921. (Year: 2015).*

(Continued)

*Primary Examiner* — Rhonda S Peace
(74) *Attorney, Agent, or Firm* — David S. Alavi

(57) ABSTRACT

A linearly polarized upconverting optical signal at optical frequency $\nu_{OPT}$ and a propagating input signal at frequency $\nu_{GHz}$ are combined by an input beam combiner to copropagate through a nonlinear optical medium and generate upconverted optical signals at one or both sum or difference frequencies $\nu_{SUM} = \nu_{OPT} + \nu_{GHz}$ or $\nu_{DIFF} = \nu_{OPT} - \nu_{GHz}$. The orthogonally polarized upconverting and upconverted optical signals are separated by a polarizer, and the upconverted optical signal is preferentially transmitted to a detection system by an optical filter. The input signal is modulated to encode transmitted information, and that modulation is imparted onto the upconverted optical signal. The detection system includes one or more photodetectors, receives the upconverted optical signal, and generates therefrom electrical signals that are modulated to encode the transmitted information.

25 Claims, 3 Drawing Sheets

(56) References Cited

U.S. PATENT DOCUMENTS

| | | | |
|---|---|---|---|
| 5,710,430 | A | 1/1998 | Nuss |
| 5,789,750 | A | 8/1998 | Nuss |
| 5,894,125 | A | 4/1999 | Brener et al. |
| 5,939,721 | A | 8/1999 | Jacobsen et al. |
| 5,952,818 | A | 9/1999 | Zhang et al. |
| 6,078,047 | A | 6/2000 | Mittleman et al. |
| 6,151,155 | A | 11/2000 | Durfee et al. |
| 6,414,473 | B1 | 7/2002 | Zhang et al. |
| 7,272,158 | B1 | 9/2007 | Hayes et al. |
| 7,339,718 | B1 | 3/2008 | Vodopyanov et al. |
| 7,349,609 | B1 | 3/2008 | Vodopyanov et al. |
| 7,929,580 | B2 | 4/2011 | Moeller |
| 8,035,083 | B1 | 10/2011 | Kozlov et al. |
| 8,514,393 | B2 | 8/2013 | Khan et al. |
| 8,599,474 | B1 | 12/2013 | Kozlov et al. |
| 8,599,475 | B1 | 12/2013 | Kozlov et al. |
| 8,599,476 | B1 | 12/2013 | Kozlov et al. |
| 9,377,362 | B2 | 6/2016 | Kozlov et al. |
| 9,574,944 | B1 | 2/2017 | Kozlov et al. |
| 10,120,263 | B2 * | 11/2018 | Jarrahi ............... G02F 1/3534 |
| 2009/0206263 | A1 | 8/2009 | Rahman |
| 2010/0046962 | A1 | 2/2010 | Yu |
| 2012/0194901 | A1 | 8/2012 | Bravo-Abad et al. |
| 2016/0359569 | A1 | 12/2016 | Dailey et al. |
| 2017/0067783 | A1 | 3/2017 | Kozlov et al. |
| 2018/0283950 | A1 | 10/2018 | Ge et al. |
| 2019/0242747 | A1 | 8/2019 | Pedersen et al. |
| 2020/0220261 | A1 * | 7/2020 | Feng ..................... H01Q 3/22 |
| 2021/0311371 | A1 * | 10/2021 | Kozlov ............... G02F 1/3534 |

OTHER PUBLICATIONS

International Search Report and Written Opinion dated Jul. 19, 2021 for counterpart App No. PCT/US2021/025658.

Schaar et al; "Intracavity Terahertz Generation in a Synchronously Pumped Optical Parametric Oscillator using Quasiphasematched GaAs"; Conference on Lasers and Electro-Optics, Paper No. CThI6 (2007).

Schaar et al; Terahertz Sources Based on Intracavity Parametric Down-Conversion in Quasi-Phase-Matched Gallium Arsenide; IEEE J Sel Topics Quant Electron vol. 14 No. 2 p. 354 (2008).

Jiang et al; "Improvement of terahertz imaging with a dynamic subtraction technique"; Applied Optics vol. 39 No. 17 p. 2982 (2000).

Nahata et al; "Two-dimensional imaging of continuous-wave terahertz radiation using electro-optic detection"; Applied Physics Letters vol. 81 No. 6 p. 963 (2002).

Yonera et al; "Millisecond THz imaging based on two-dimensional EO sampling using a high speed CMOS camera"; Conference on Lasers and Electro-Optics, Paper No. CMB3 (2004).

Ding et al; "Phase-Matched THz Frequency Upconversion in a GaP Crystal"; Conference on Lasers and Electro-Optics, Paper No. CTuL3 (2006).

Ding et al; "Observation of THz to near-infrared parametric conversion in ZnGeP2 crystal"; Optics Express vol. 14 No. 18 p. 8311 (2006).

Hurlbut et al: "THz-wave generation inside a high-finesse ring-cavity OPO pumped by a fiber laser"; vol. 7582 p. 75820Z-1 (2010).

Cao et al; "Coherent detection of pulsed narrowband terahertz radiation"; Applied Physics Letters vol. 88 p. 011101 (2006).

Vodopyanov; "Optical generation of narrow-band terahertz packets in periodically inverted electro-optic crystals . . . "; Optics Express vol. 14 No. 6 p. 2263 (2006).

Lee et al; "Generation of multicycle terahertz pulses via optical rectification in periodically inverted GaAs structures"; Applied Physics Letters vol. 89 p. 181104 (2006).

Khan et al; "Optical detection of terahertz radiation by using nonlinear parametric upconversion"; Optics Letters vol. 32 No. 22 p. 3248 (2007).

Schaar et al; "Intracavity terahertz-wave generation in a synchronously pumped optical parametric oscillator . . . "; Optics Letters vol. 32 No. 10 p. 1284 (2007).

Khan et al; "Optical detection of terahertz using nonlinear parametric upconversion"; Optics Letters vol. 33 No. 23 p. 2725 (2008).

Vodopyanov et al; "Resonantly-enhanced THz-wave generation via multispectral mixing . . . "; Conference on Lasers and Electro-Optics, Paper No. CTuG1 (2009).

Pedersen et al; "Enhanced 2D image upconversion using solid-state lasers"; Optics Express vol. 17 No. 23 p. 20885 (2009).

Hurlbut et al; "THz-wave generation inside a high-finesse ring-cavity OPO pumped by a fiber laser"; Conference on Lasers and Electro-Optics, Paper No. CWF3 (2010).

Tekavec et al; "Efficient high-power tunable terahertz sources based on intracavity difference frequency generation"; Paper No. IRMMW THz in 36th Int'l Conf on Infrared, Millimeter and Terahertz Waves (2011).

Tekavec et al; "Terahertz generation from quasi-phase matched gallium arsenide using a type II ring cavity optical parametric oscillator"; Proc. SPIE 8261, Terahertz Technology and Applications V, 82610V; doi:10.1117/12.909529 (2012).

Clerici et al; "CCD-based imaging and 3D space-time mapping of terahertz fields via Kerr frequency conversion"; Optics Letters vol. 38 No. 11 p. 1899 (Jun. 1, 2013).

Fan et al; "Room temperature terahertz wave imaging at 60 fps by frequency up-conversion in DAST crystal"; Proc. SPIE 8964, Nonlinear Frequency Generation and Conversion: Materials, Devices, and Applications XIII, 89640B (Feb. 20, 2014); doi:10.1117/12.2038685.

Tekavec et al; Video Rate THz imaging based on frequency upconversion using a near-IR CMOS camera: CLEO: Science and Innovations 2014 (San Jose, California United StatesJun. 8-13, 2014; ISBN: 978-1-55752-999-2.

Zhang et al; "Terahertz Imaging via Electrooptic Effect"; IEEE Trans Microwave Theory & Tech vol. 47 No. 12 p. 2644 (1999).

Ghotbi et al; "990 mW average power, 52% efficient, high-repetition-rate picosecond-pulse generation in the blue with BiB3O6"; Optics Letters, vol. 30, No. 24 p. 3395; Dec. 15, 2005.

Vodopyanov et al; "Terahertz-wave generation in quasi-phase-matched GaAs"; Appl Phys Lett vol. 89 p. 141119 (2006).

Vodopyanov et al; "Terahertz-wave generation in quasi-phase-matched GaAs"; Appl Phys Lett vol. 89 p. 141119 (2006); equivalent to Conference on Lasers and Electro-Optics, Paper No. CTuGG (2006).

Fan et al; "Real-time terahertz wave imaging by nonlinear optical frequency up-conversion in a 4-dimethylamino-N'-methyl-4-stilbazolium tosylate crystal"; Applied Physics Letters, 104, 101106 (2014); doi:10.1063/1.4868134.

Tekavec et al; "Video Rate 3D THz tomography": rejected post-deadline paper, Conference on Lasers and Electro-optics (Jun. 8-13, 2014, San Jose, California).

Wu et al; "Two-dimensional electro-optic imaging of THz beams"; Applied Physios Letters vol. 69 No. 8 p. 1026 (1996).

Jiang et al; "Terahertz imaging via electrooptic effect"; IEEE Transactions on Microwave Theory and Techniques vol. 47 No. 12 p. 2644 (1999).

Hurlbut et al: "THz-wave generation inside a high-finesse ring-cavity OPO pumped by a fiber laser"; Proc SPIE vol. 7582 p. 75820Z-1 (2010).

Jazbinsek et al; "Organic Crystals for THz Photonics"; Applied Sciences vol. 9 p. 882 (2019).

* cited by examiner

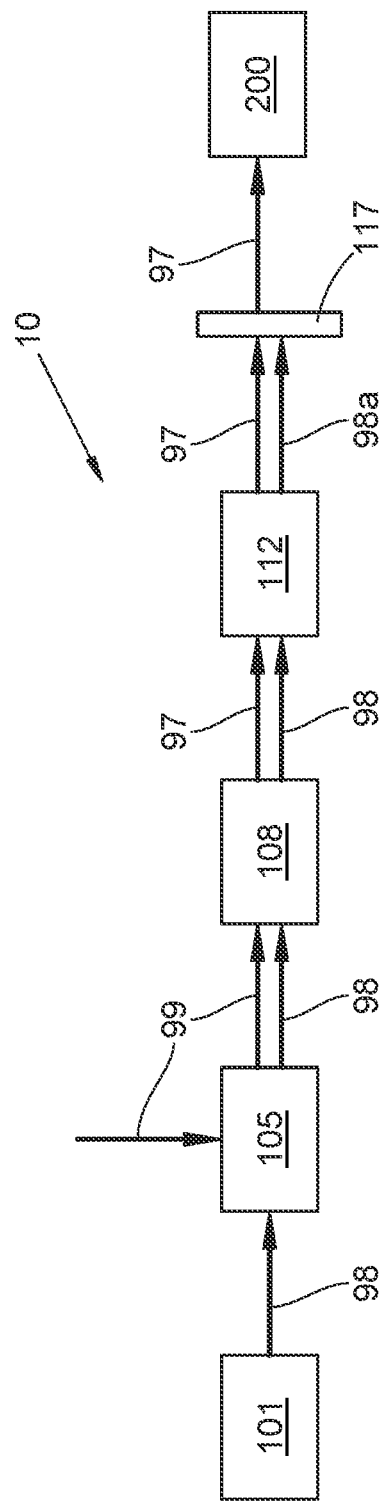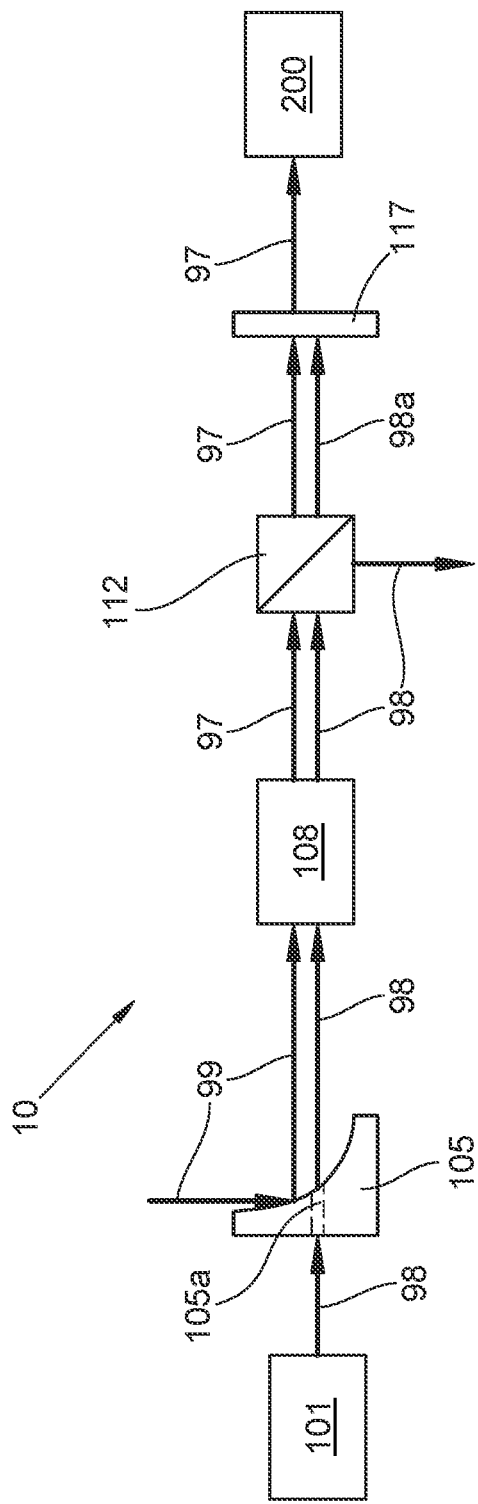

US 11,262,639 B2

APPARATUS AND METHODS FOR UPCONVERSION OF A MILLIMETER-WAVE SIGNAL AND DETECTION OF THE UPCONVERTED SIGNAL

BENEFIT CLAIMS TO RELATED APPLICATIONS

This application claims benefit of U.S. provisional App. No. 63/004,711 entitled "Apparatus and methods for upconversion of a millimeter-wave signal and detection of the upconverted signal" filed Apr. 3, 2020 in the name of Vladimir G. Kozlov, said provisional application being hereby incorporated by reference as if set forth herein in its entirety.

FIELD OF THE INVENTION

The field of the present invention relates to detection of electromagnetic signals. In particular, apparatus and methods are disclosed for upconversion of a millimeter-wave signal and detection of the upconverted signal.

SUMMARY

An inventive apparatus includes a continuous-wave upconverting laser source, an input beam combiner, a nonlinear optical medium, a linear polarizer, a spectrally selective optical filter, and a detection system. The continuous-wave upconverting laser source produces a linearly polarized upconverting optical signal characterized by an upconverting optical frequency $v_{OPT}$. The upconverting optical signal and a propagating input signal are each incident on the input beam combiner, which combines them to copropagate away from the input beam combiner. The input signal is characterized by a gigahertz input signal frequency $v_{GHz}$ and is modulated to encode transmitted information. The combined upconverting optical signal and input signal copropagate through the nonlinear optical medium and generate therein one or more upconverted optical signals, at one or both sum or difference frequencies $v_{SUM} = v_{OPT} + v_{GHz}$ or $v_{DIFF} = v_{OPT} - v_{GHz}$. The upconverted optical signal(s) copropagate with the upconverting optical signal and are linearly polarized substantially orthogonal to polarization of the upconverting optical signal. The linear polarizer separates propagation of the upconverting optical signal from propagation of the upconverted optical signal(s). The spectrally selective optical filter preferentially transmits at least one of the separated upconverted optical signal(s) relative to transmission of a copropagating, residual portion of the upconverting optical signal that is linearly polarized substantially parallel to polarization of the upconverted optical signal(s). The detection system, which includes one or more photodetectors, receives the upconverted optical signal(s) transmitted by the optical filter and generates therefrom one or more electrical signals. The generated electrical signals include at least portions thereof that are modulated to encode the transmitted information.

In some examples the detection system operates by direct detection of the upconverted optical signal(s) by the one or more photodetectors. In some examples the detection system includes a continuous-wave local-oscillator laser source that produces a local-oscillator optical signal characterized by a local-oscillator optical frequency either $v_{LO} = v_{SUM}$ or $v_{LO} = v_{DIFF}$. In such examples the detection system combines upconverted and local-oscillator optical signals on one or more of the photodetectors in an intradyne or homodyne arrangement to generate electrical signals that are modulated to encode the transmitted information. In some examples the detection system combines upconverted and residual upconverting optical signals on one or more of the photodetectors in a heterodyne arrangement to generate electrical signals that are modulated to encode the transmitted information.

Objects and advantages pertaining to millimeter-wave upconversion and detection may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is a functional block diagram of an inventive receiver.

FIGS. 2, 3, and 4 are schematic diagrams of three examples embodiments of an inventive receiver.

Figure 3:
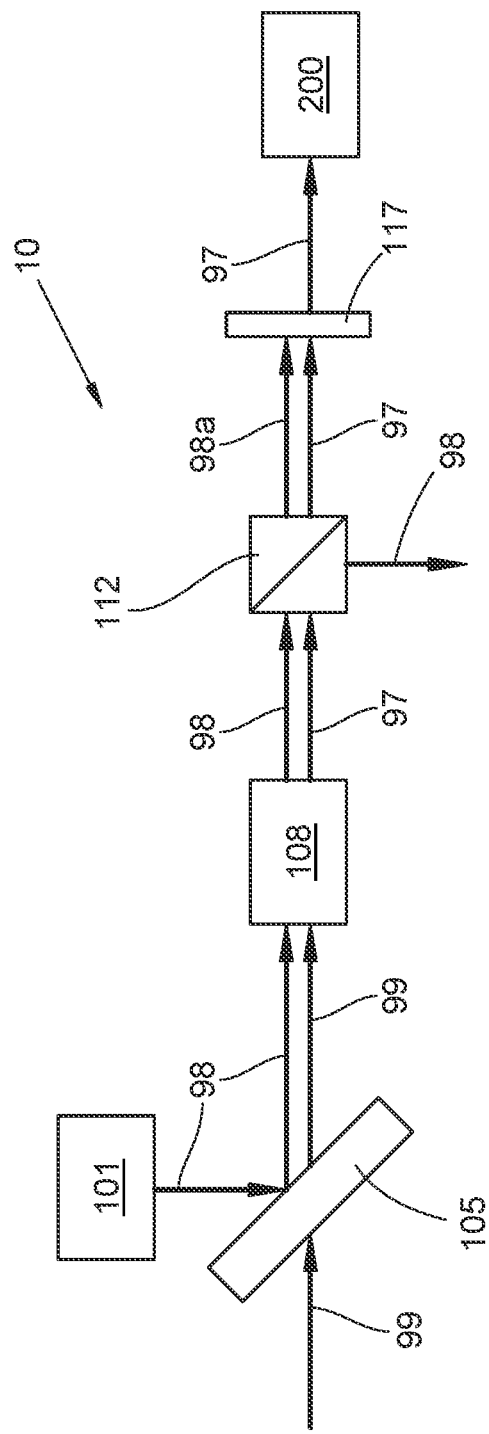

The embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. In particular, copropagating or counterpropagating signals are indicated by side-by-side arrows in the drawings for clarity, even though those signals typically are not laterally displaced from one another. The embodiments shown are only examples and should not be construed as limiting the scope of the present disclosure or appended claims.

DETAILED DESCRIPTION OF EMBODIMENTS

Wireless telecommunications protocols are evolving and expanding to keep up with ever increasing demand for speed and capacity for voice, audio, video, and data transmission. A significant fraction of so-called front-haul and back-haul connections to antennae (e.g., cell towers or base stations) is provided using wireless transmission in the millimeter-wave region of the electromagnetic spectrum (also referred to by its ITU designation as extremely high frequency (EHF); between 30 GHz and 300 GHz). Conventional millimeter-wave receivers typically can accommodate data rates only up to about 10 or perhaps 20 Gbps and carrier frequencies under 100 GHz. A need exists for high-speed receivers operating in the millimeter-wave portion of the spectrum that can operate at carrier frequencies above 100 GHz or that can accommodate data transmission rates of several hundred Gbps (gigabits per second) or more.

Figure 4:
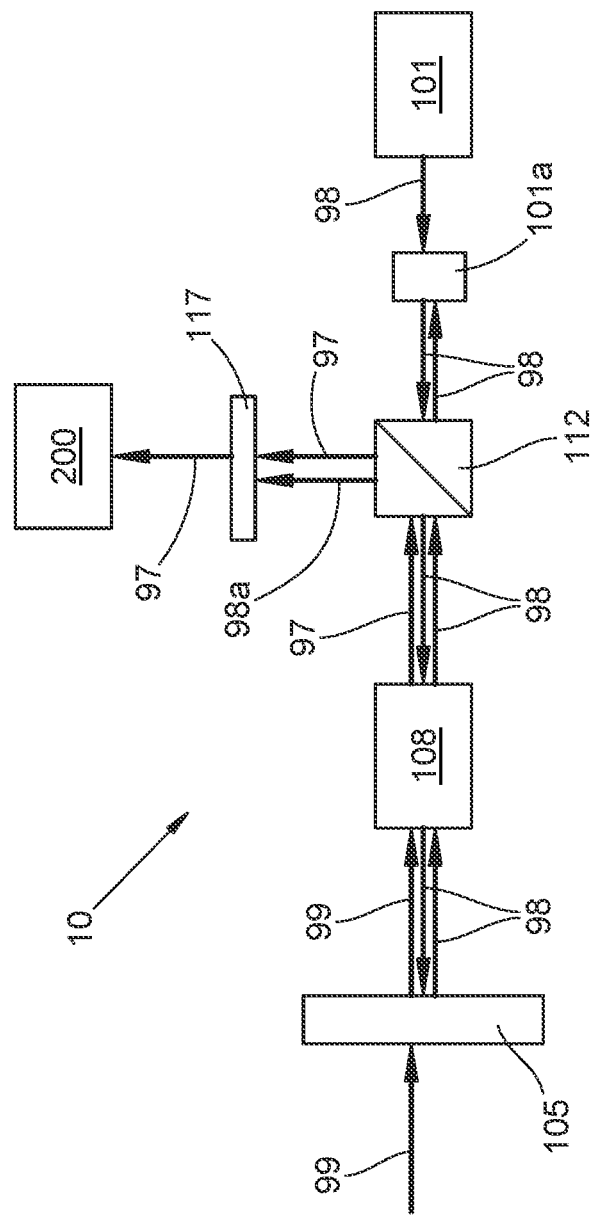

A functional block diagram of an inventive apparatus 10 (i.e., a high-speed millimeter-wave receiver 10) is shown in FIG. 1; several example embodiments are illustrated schematically in FIGS. 2 through 4. An inventive receiver 10 includes an upconverting laser source 101, an input beam combiner 105, a nonlinear optical medium (NLO medium) 108, a linear polarizer 112, a spectrally selective optical filter 117, and a detection system 200. The inventive receiver 10 is arranged for upconverting a propagating millimeter-wave input signal 99 to a visible or infrared optical frequency and then detecting the resulting upconverted optical signal 97. The input signal 99 is modulated to encode transmitted information, and the resulting upconverted optical signal 97 is also modulated to encode that transmitted information, enabling subsequent demodulation of the upconverted optical signal 97 and decoding of the transmitted information encoded by the modulation of the input signal 99.

The input signal 99 is characterized by a gigahertz input signal frequency $v_{GHz}$ (i.e., the carrier frequency) in the millimeter-wave region of the electromagnetic spectrum. The input signal frequency $v_{GHz}$ typically can be between about and about $3.0 \times 10^{10}$ Hz and about $3.0 \times 10^{11}$ Hz (i.e., between about 30 and 300 GHz); in some examples the input signal frequency $v_{GHz}$ can be between about $5 \times 10^{10}$ Hz and about $1.0 \times 10^{11}$ Hz (i.e., between about 50 and 100 GHz). In some examples the input signal 99 can be characterized by input signal bandwidth $\Delta v_{GHz}$ less than about $1.0 \times 10^{11}$ Hz, less than about $1.0 \times 10^{10}$ Hz, or less than about $1.0 \times 10^{9}$ Hz. The input signal bandwidth $\Delta v_{GHz}$ generally should be large enough to transmit information at the desired data transmission rate. The input signal power can vary widely. In some examples the input signal power $P_{GHz}$ of the input signal 99 can be less than about 100. W, less than about 10. W, less than about 1.0 watt, less than about 0.10 W, less than about 0.010 W, less than about 0.0010 W, or less than about 0.00010 W. An inventive millimeter-wave receiver 10 that can function at lower input signal powers $P_{GHz}$ can exhibit higher detection sensitivity, which is generally desirable. Higher detection sensitivity in turn can enable transmission over greater distance or use of lower-power transmitters.

The propagating input signal 99 is modulated to encode transmitted information; the information can be of any suitable type, e.g., voice or other audio, video, or data. The modulation can be according to any suitable analog or digital modulation scheme, including for example pulse amplitude modulation (PAM), quadrature amplitude modulation (QAM), pulse code modulation (PCM), pulse position modulation (PPM), phase-shift keying (PSK), amplitude-shift keying, or other suitable analog or digital modulation scheme. In some examples the modulation can encode information transmitted at a data rate greater than about 10 Gbps, greater than about 50 Gbps, greater than about 100 Gbps, greater than about 200 Gbps, or greater than about 500 Gbps.

The continuous-wave upconverting laser source 101 produces a linearly polarized upconverting optical signal 98 characterized by an upconverting optical frequency $v_{OPT}$, typically in the visible or infrared region of the electromagnetic spectrum. In some examples the upconverting optical frequency $v_{OPT}$ can be between about $7.5 \times 10^{13}$ Hz and about $7.5 \times 10^{14}$ Hz (i.e., between about 400 nm and about 4 µm), between about $1.5 \times 10^{14}$ Hz and about $3.0 \times 10^{14}$ Hz (i.e., between about 1 µm and about 2 µm), between about $1.7 \times 10^{14}$ Hz and about $2.2 \times 10^{14}$ Hz (i.e., between about 1.4 µm and about 1.7 µm), or between about $1.8 \times 10^{14}$ Hz and about $2.0 \times 10^{14}$ Hz (i.e., between about 1.5 µm and about 1.6 µm). In some examples the upconverting optical signal can be characterized by upconverting bandwidth $\Delta v_{OPT}$ less than about $1.0 \times 10^{9}$ Hz, less than about $1.0 \times 10^{8}$ Hz, less than about $1.0 \times 10^{7}$ Hz, less than about $1.0 \times 10^{6}$ Hz, or less than about $1.0 \times 10^{5}$ Hz. In some examples the upconverting optical signal 98 can be characterized by upconverting optical power $P_{OPT}$ greater than about 0.010 W, greater than about 0.10 W, greater than about 1.0 W, greater than about 10. W, or greater than about 100. W. Larger optical power can potentially increase the sensitivity of the millimeter-wave receiver 10. Typical examples of an upconverting laser source 101 can include one or more of a semiconductor laser, a semiconductor optical amplifier, a doped optical fiber laser, a doped optical fiber amplifier, a solid-state laser, or a solid-state optical amplifier; other suitable types of laser source can be employed. In some examples the upconverting laser source 101 can include a laser emitter that produces linearly polarized output that can be used directly as the upconverting optical signal 99. In some examples the laser source 101 includes the laser emitter and a laser polarizer (of any suitable type or arrangement); a linearly polarized portion of output of the laser emitter is transmitted by the laser polarizer as the upconverting optical signal 99. In some examples the laser source 101 can include an optical isolator (of any suitable type or arrangement) to reduce or prevent optical feedback into the laser emitter.

The propagating input signal 99 and the upconverting optical signal 98 are each incident on the input beam combiner 105, which combines them to copropagate away from the input beam combiner 105. The input beam combiner 105 can be of any suitable type or arrangement. In some examples, (e.g., as in FIG. 2), the input beam combiner 105 can comprise an off-axis reflector having a hole 105a through it. The upconverting optical signal 98 propagates through the hole 105a; the input signal 99 is reflected by the input beam combiner 105 to copropagate with the upconverting optical signal 98. In some other examples (e.g., as in FIGS. 3 and 4), the input beam combiner 105 can be arranged to reflect the upconverting optical signal 98 incident on a first surface of the input beam combiner 105 (at non-normal incidence, as in FIG. 3, or at normal incidence, as in FIG. 4), and to transmit the propagating input signal 99 incident on a second surface. The input beam combiner 105 is arranged so that transmitted input beam 99 copropagates with the reflected upconverting optical signal 98. In the example of FIG. 4, the polarizing beamsplitter 112 also acts to polarize the upconverting optical signal 98 on its first pass through the beamsplitter 112, and an optical isolator 101a is inserted between the laser source 101 and the beamsplitter 112 to block the upconverting optical signal 98 and prevent its reentry into the laser source 101 after its second pass through the beamsplitter 112.

The combined upconverting optical signal 98 and input signal 99 copropagate through the nonlinear optical medium 108 and generate therein one or more upconverted optical signals 97. The upconverted optical signals 97 can be generated at one or both sum or difference frequencies $v_{SUM} = v_{OPT} + v_{GHz}$ or $v_{DIFF} = v_{OPT} - v_{GHz}$. Like the optical frequency $v_{OPT}$ of the upconverting optical signal 98, those sum and difference frequencies are in the visible or infrared regions of the electromagnetic spectrum. Given the relatively small frequency separation, both sum and difference frequencies are typically generated; in some instances only one or the other is generated, and such instances are understood to fall within the scope of the present disclosure and appended claims. The upconverted optical signals 97 are modulated in accordance with the modulation of the input signal 99. The nonlinear optical medium 108 can include any suitable or desirable one or more materials, and can be of any suitable type or arrangement. In some examples a single-crystal nonlinear optical medium 108 can be employed that can be critically or non-critically phase matched (e.g., by angle, temperature, or otherwise) for upconversion at the desired gigahertz and upconverting frequencies $v_{GHz}$ and $v_{OPT}$, or that exhibits a sufficiently long coherence length at those frequencies. In some examples the nonlinear optical medium 108 can include a periodic medium arranged for quasi-phase-matched (QPM) generation of the one or more upconverted optical signals; in some of those examples the periodic medium can comprise a periodically poled organic or inorganic medium, an orientation-patterned semiconductor medium, or a stack of optically contacted or diffusion-bonded plates. Examples of suitable nonlinear optical materials can include, but are not limited to: one or more of gallium arsenide or gallium phosphide or other III-V semiconductors or alloys thereof; one or more II-VI semiconductors or alloys thereof; one or more of DAST (4-N,N-dimethylamino-4'-N'-methyl-stilbazolium tosylate), OH1 (2-(3-(4-hydroxystyryl)-5,5-dimethylcyclohex-2-enylidene) malononitrile), or DSTMS (4-N,N-dimethylamino-4'-N'-methyl-stilbazolium 2,4,6-trimethylbenzenesulfonate), or other organic material; potassium or lithium niobate or other inorganic material; or other suitable nonlinear optical materials. Suitability can be based at least in part on one or more of sufficient transparency for the upconverting optical signal 98, sufficient transparency for the input signal 99, or sufficiently large nonlinear optical coefficient for upconversion of the input signal 99 to form the upconverted optical signal 97.

The upconverted optical signals 97 copropagate with the remaining upconverting optical signal 98 that is transmitted through nonlinear optical medium 108. With relatively low power of the input signal 99, the power of the upconverted optical signal 97 (e.g., a few µW to a few 10 s of µW) in some instances can be quite small relative to that of the upconverting optical signal 98 (e.g., 1 to 10 W), separation of those signals is needed to enable detection and demodulation of the upconverted optical signals 97. The nonlinear upconversion process that takes place in the nonlinear optical medium 108 results in substantially orthogonal linear polarizations of the upconverted and upconverting optical signals 97 and 98. That orthogonal polarization can be exploited to separate at least a substantial portion of the upconverting optical signal 98 from the upconverted optical signal 97. The linear polarizer 112 separates propagation of the upconverting optical signal 98 from propagation of the upconverted optical signals 97; a residual portion 98a of the upconverting optical signal 98, that is linearly polarized substantially parallel to polarization of the upconverted optical signal 97, typically copropagates with the upconverted optical signal 97 from the linear polarizer 112 toward the detection system 200. The linear polarizer 112 can be of any suitable type or arrangement, e.g., an absorptive polarizer such as a dichroic glass polarizer, a birefringent prism polarizer such as a Glan Taylor or Glan Thompson polarizer, or a polarizing beamsplitter (e.g., as in FIGS. 2-4). Use of an absorptive polarizer might be less desirable in some instances, given the relatively high power of the upconverting optical signal 98, which would be absorbed by an absorptive polarizer. If a prism polarizer or polarizing beamsplitter is employed, in some instances it may be desirable to arrange the linear polarizer 112 so that the upconverted optical signal 97 is transmitted rather than reflected; rejection of the unwanted polarization typically is higher for the transmitted beam than for the reflected beam (i.e., the relative power of the residual upconverting signal 98a is less when the upconverted optical signal 97 is transmitted rather than reflected by the polarizer 112). In other instances, arrangement of the linear polarizer 112 so that the upconverted optical signal 97 is reflected can be acceptable or even desirable.

To reduce the residual upconverting optical signal 98a relative to the upconverted optical signal 97, a spectrally selective optical filter 117 is positioned between the linear polarizer 112 and the detection system 200. The filter 117 preferentially transmits at least one of the separated upconverted optical signals 97 relative to transmission of a copropagating, residual upconverting optical signal 98a. If both sum- and difference-frequency upconverted optical signals 97 are desired, then a notch filter 117 can be employed. The notch filter 117 can be of any suitable type or arrangement, such as a multilayer thin-film filter or a Bragg filter. Given the relatively small frequency spacings (i.e., $v_{OPT}$ of about $2 \times 10^{14}$ Hz (wavelength about 1500 nm) and $v_{GHz}$ of 30 to 300 GHz result in wavelength separation of about 0.2 to 2 nm), a notch filter would need to be exceedingly narrow. Suitable examples can include, e.g., BragGrate™ Raman filters produced by OptiGrate Corporation, Bragg filters disclosed in U.S. Pat. No. 6,673,497 issued to Elimov et al (which is incorporated by reference as if fully set forth herein), or crystalline colloidal Bragg filters such as those disclosed in Asher et al, Spectroscopy Vol. 1 No. 12 p. 26 (1986) (which is incorporated by reference as if fully set forth herein).

In some instances, only one or the other of the sum- or difference-frequency upconverted optical signals 97 is desired to reach the detection system 200. That can be the case, e.g., if coherent detection is to be used to demodulate the upconverted optical signal 97 to recover the encoded transmitted information. If only one of the upconverted optical signals 97 is desired, then a short-pass, long-pass, or band-pass optical filter 117 (or a suitable combination thereof) can be employed. Such a spectrally selective optical filter 117 can be arranged to preferentially transmit the desired upconverted optical signal 97 relative to transmission of the other upconverted optical signal 97 and relative to the copropagating, residual upconverting optical signal 98a. The high-pass, short-pass, or bandpass filter can be of any suitable type or arrangement, such as a multilayer thin-film filter. Given the relatively small frequency spacings, the spectrally selective filter 117 should exhibit a suitably steep dependence of transmission on optical frequency. Instead or in addition, other types of wavelength dependent filters 117 (e.g., such as those employed in DWDM optoelectronic telecommunications systems) can be employed for discriminating between the upconverted optical signal 97 and the residual upconverting optical signal 98a. Although only the upconverted optical signal 97 is explicitly labelled in the drawings as entering the detection system 200, it should be understood that a small amount of the residual upconverting signal 98a typically gets through the optical filter 117 and reaches the detection system 200. In some examples, that surviving optical signal 98a is small enough to enable detection of the upconverted signal 97 despite the presence of the residual optical signal 98a as a background signal. In some other examples, the surviving optical signal 98a that reaches the detection system 200 is employed in detection of the upconverted signal 97 (discussed further below).

The detection system 200 includes one or more photodetectors. It receives the upconverted optical signal 97 transmitted by the optical filter 117 and generates therefrom one or more electrical output signals that include at least portions thereof that are modulated to encode the transmitted information that was encoded by the modulation of the input signal 99. In that way the inventive receiver 10 transfers the information carried by the input signal 99 via free-space propagation to be carried by the one or more electrical output signals to be carried by electrical propagation along one or more conductive wires or cables. In some examples the one or more photodetectors can include one or more avalanche photodiodes or one or more p-i-n photodiodes; other suitable types of photodetectors can be employed. In some examples the detection system 200 can operate by direct detection of modulated intensity of the upconverted optical signal 97, in some instances superimposed on a background signal resulting from that portion of the residual upconverting optical signal 98a that is transmitted through the optical filter 117.

Figure 5:
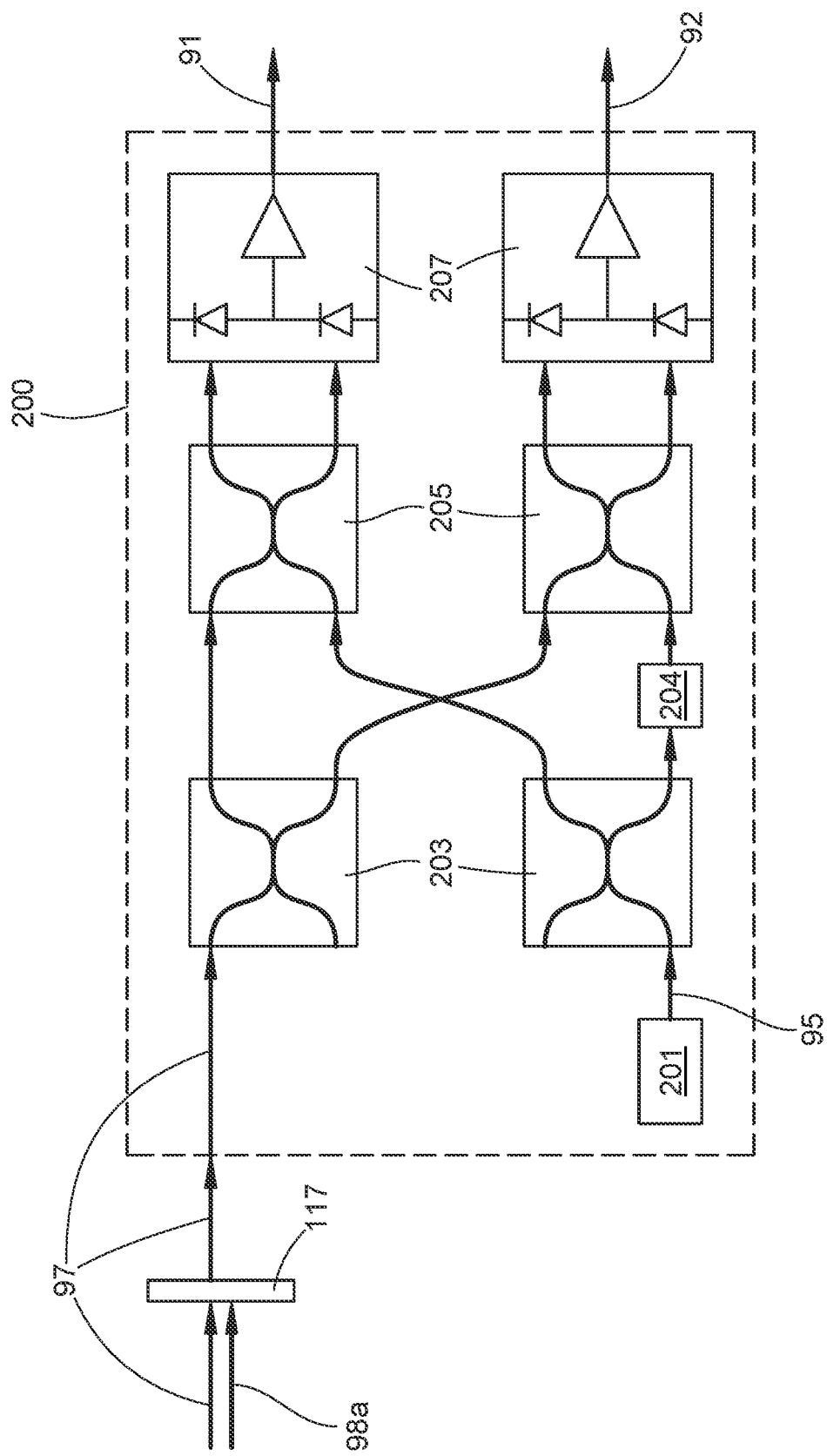
FIG. 5 is a schematic diagram of an example coherent detection arrangement incorporated into some examples of an inventive receiver.

In some examples the detection system 200 can operate by conventional coherent detection (e.g., as in FIG. 5). In such examples the detection system 200 can include a continuous-wave local-oscillator laser source 201 arranged so as to produce a local-oscillator optical signal 95 characterized by a local-oscillator optical frequency either $\nu_{LO}=\nu_{SUM}$ or $\nu_{LO}=\nu_{DIFF}$, depending on which of the sum- or difference-frequency upconverted optical signals 97 is preferentially transmitted through the optical filter 117. The detection system 200 can include four 3 dB couplers 203 and 205 and a 90° phase shifter 204 in a standard so-called 90-degree-hybrid arrangement, an example of which is illustrated schematically in FIG. 5. The four resulting optical signals are incident on two pairs 207 of balanced photodetectors, and the resulting electrical output signals 91 and 92 represent in-phase and quadrature components of the modulation of the input signal 99. In some examples the upconverting laser source 101 and the local-oscillator laser source 201 operate without phase locking between them, so that there can be relative frequency drift or phase noise between the upconverted optical signal 97 and the local-oscillator optical signal 95. Conventional coherent detection systems include circuits for compensating or correcting for such drift or phase noise, and the resulting detection system 200 operates as an intradyne detection system. In some examples the upconverting laser source 101 and the local-oscillator laser source 201 are coupled (in any suitable way) for phase-locked operation; in such examples, the detection system 200 operates as a homodyne detection system.

As noted above, in many instances a small amount of the residual optical signal 98a reaching the detection system 200 is virtually unavoidable, but is small enough to allow direct detection of the upconverted optical signal 97, or does not affect coherent detection of the upconverted optical signal 97. In some other examples, the residual optical signal 98a is used to assist in detection of the upconverted optical signal 97 by acting as a local-oscillator optical signal. In such examples an electrical signal produced by mixing of the upconverted optical signal 97 and the residual optical signal 98a on a photodetector includes a heterodyne component that oscillates at the gigahertz input signal frequency $\nu_{GHz}$. That oscillating heterodyne component includes the modulation that encodes at least one or more portions of the transmitted information. The detection system 200 can be arranged in any suitable way for detecting the heterodyne component, in some instances including an electrical high-pass or bandpass filter arranged so as to preferentially transmit the heterodyne component relative to transmission of a non-oscillating component of the electrical signal.

Whichever of the schemes described above (direct detection, intradyne detection, homodyne detection, or heterodyne detection) is employed for generating an electrical signal that carries the modulation of the input signal 99, in some examples the detection system 200 can include a signal processing circuit structured and connected to as to receive at least modulated portions of the one or more electrical signals, demodulate the one or more electrical signals, and decode the transmitted information encoded by the modulation of the input signal. The signal processing circuit can be of any type or arrangement suitable for demodulating and decoding the transmitted information carries by the modulated input signal 99.

In addition to the preceding, the following example embodiments fall within the scope of the present disclosure or appended claims:

Example 1. A millimeter-wave receiver comprising: (a) a continuous-wave upconverting laser source arranged so as to produce a linearly polarized upconverting optical signal characterized by an upconverting optical frequency $\nu_{OPT}$; (b) an input beam combiner that is positioned and arranged so as to combine the upconverting optical signal and a propagating input signal, each incident on the input beam combiner, to copropagate away from the input beam combiner, the input signal being (i) characterized by a gigahertz input signal frequency $\nu_{GHz}$ and (ii) modulated to encode transmitted information; (c) a nonlinear optical medium positioned and arranged so that the combined upconverting optical signal and input signal copropagate through the nonlinear optical medium and generate therein one or more upconverted optical signals, at one or both sum or difference frequencies $\nu_{SUM}=\nu_{OPT}+\nu_{GHz}$ or $\nu_{DIFF}=\nu_{OPT}-\nu_{GHz}$, that copropagate with the upconverting optical signal and are linearly polarized substantially orthogonal to polarization of the upconverting optical signal; (d) a linear polarizer positioned and arranged so as to separate (i) propagation of the upconverting optical signal from (ii) propagation of the one or more upconverted optical signals; (e) a spectrally selective optical filter positioned and arranged so as to preferentially transmit at least one of the separated upconverted optical signals relative to transmission of a copropagating, residual portion of the upconverting optical signal that is linearly polarized substantially parallel to polarization of the upconverted optical signal; and (f) a detection system that includes one or more photodetectors and is positioned and arranged so as to (i) receive the upconverted optical signal transmitted by the optical filter and (ii) generate therefrom one or more electrical output signals that include at least portions thereof that are modulated to encode at least portions of the transmitted information.

Example 2. The apparatus of Example 1 wherein the input beam combiner is structured and positioned so as to (i) reflect the upconverting optical signal incident on a first surface of the input beam combiner and (ii) transmit the propagating input signal incident on a second surface of the input beam combiner to copropagate with the reflected upconverting optical signal.

Example 3. The apparatus of Example 1 wherein the input beam combiner comprises an off-axis reflector structured and positioned so as to (i) transmit the upconverting optical signal through a hole in the reflector and (ii) reflect the propagating input signal to copropagate with the upconverting optical signal.

Example 4. The apparatus of any one of Examples 1 through 3 wherein the linear polarizer comprises a polarizing beamsplitter.

Example 5. The apparatus of any one of Examples 1 through 4 wherein the gigahertz input signal frequency $\nu_{GHz}$ is between about $3.0\times10^{10}$ Hz and about $3.0\times10^{11}$ Hz, or between about $5\times10^{10}$ Hz and about $1.0\times10^{11}$ Hz.

Example 6. The apparatus of any one of Examples 1 through 5 wherein the input signal is characterized by input signal bandwidth $\Delta\nu_{GHz}$ less than about $1.0\times10^{11}$ Hz, less than about $1.0\times10^{10}$ Hz, or less than about $1.0\times10^{9}$ Hz.

Example 7. The apparatus of any one of Examples 1 through 6 wherein the input signal is characterized by input signal power $P_{GHz}$ less than about 100. W, less than about 10.

W, less than about 1.0 watt, less than about 0.10 W, less than about 0.010 W, less than about 0.0010 W, or less than about 0.00010 W.

Example 8. The apparatus of any one of Examples 1 through 7 wherein the upconverting optical frequency $v_{OPT}$ is between about $7.5 \times 10^{13}$ Hz and about $7.5 \times 10^{14}$ Hz, between about $1.5 \times 10^{14}$ Hz and about $3.0 \times 10^{14}$ Hz, between about $1.7 \times 10^{14}$ Hz and about $2.2 \times 10^{14}$ Hz, or between about $1.8 \times 10^{14}$ Hz and about $2.0 \times 10^{14}$ Hz.

Example 9. The apparatus of any one of Examples 1 through 8 wherein the upconverting optical signal is characterized by upconverting bandwidth $\Delta v_{OPT}$ less than about $1.0 \times 10^9$ Hz, less than about $1.0 \times 10^8$ Hz, less than about $1.0 \times 10^7$ Hz, less than about $1.0 \times 10^6$ Hz, or less than about $1.0 \times 10^5$ Hz.

Example 10. The apparatus of any one of Examples 1 through 9 wherein the upconverting optical signal is characterized by upconverting optical power $P_{OPT}$ greater than about 0.010 W, greater than about 0.10 W, greater than about 1.0 W, greater than about 10. W, or greater than about 100. W.

Example 11. The apparatus of any one of Examples 1 through 10 wherein the upconverting laser source includes an optical isolator.

Example 12. The apparatus of any one of Examples 1 through 11 wherein the upconverting laser source includes a laser emitter and a laser polarizer arranged so that a linearly polarized portion of output of the laser emitter is transmitted by the laser polarizer as the upconverting optical signal.

Example 13. The apparatus of Example 12 wherein the linear polarizer is positioned and arranged so as to act as the laser polarizer, and the input beam combiner is arranged at substantially normal incidence with respect to the upconverting optical signal incident on the first surface.

Example 14. The apparatus of any one of Examples 1 through 13 wherein the upconverting laser source includes one or more of a semiconductor laser, a semiconductor optical amplifier, a doped optical fiber laser, a doped optical fiber amplifier, a solid-state laser, or a solid-state optical amplifier.

Example 15. The apparatus of any one of Examples 1 through 14 wherein the nonlinear optical medium includes a periodic medium arranged for quasi-phase-matched generation of the one or more upconverted optical signals.

Example 16. The apparatus of Example 15 wherein the periodic medium comprises a periodically poled medium, an orientation-patterned medium, or a stack of optically contacted plates.

Example 17. The apparatus of any one of Examples 1 through 14 wherein the nonlinear optical medium includes a birefringent medium arranged for critical or non-critical birefringent-phase-matched generation of the one or more upconverted optical signals.

Example 18. The apparatus of any one of Examples 1 through 17 wherein the nonlinear optical medium includes one or more III-V semiconductors or alloys thereof, one or more II-VI semiconductors or alloys thereof, potassium niobate or lithium niobate, other one or more inorganic nonlinear optical materials, DAST (4-N,N-dimethylamino-4'-N'-methyl-stilbazolium tosylate), OH1 (2-(3-(4-hydroxystyryl)-5,5-dimethylcyclohex-2-enylidene) malononitrile), DSTMS (4-N,N-dimethylamino-4'-N'-methyl-stilbazolium 2,4,6-trimethylbenzenesulfonate), or other one or more organic nonlinear optical materials.

Example 19. The apparatus of any one of Examples 1 through 18 wherein the detection system includes one or more avalanche photodiodes or one or more p-i-n photodiodes.

Example 20. The apparatus of any one of Examples 1 through 19 wherein: (a) the detection system includes a continuous-wave local-oscillator laser source arranged so as to produce a local-oscillator optical signal characterized by a local-oscillator optical frequency either $v_{LO} = v_{SUM}$ or $v_{LO} = v_{DIFF}$; and (b) the detection system is arranged so as to (i) combine on one or more of the photodetectors corresponding portions of the local-oscillator optical signal and the received upconverted optical signal, and (ii) generate therefrom one or more corresponding electrical signals that include at least portions thereof that are modulated to encode the transmitted information.

Example 21. The apparatus of Example 20 wherein the detection system includes a 90° phase shifter arranged so that (i) at least one photodetector receives a corresponding portion of the received upconverted optical signal combined with a corresponding phase-shifted portion of the local-oscillator optical signal, and (ii) at least one photodetector receives a corresponding portion of the received upconverted optical signal combined with a corresponding portion of the local-oscillator optical signal that is not phase shifted.

Example 22. The apparatus of any one of Examples 20 or 21 wherein: (i) the upconverting laser source and the local-oscillator laser source are arranged so as to operate without phase locking therebetween, and the detection system is arranged to operate as an intradyne detection system.

Example 23. The apparatus of any one of Examples 20 or 21 wherein: (i) the upconverting laser source and the local-oscillator laser source are coupled for phase-locked operation, and the detection system is arranged to operate as a homodyne detection system.

Example 24. The apparatus of any one of Examples 1 through 19 wherein: (d') the linear polarizer is positioned and arranged so as to direct the residual portion of the upconverting optical signal to copropagate with the one or more upconverted optical signals; and (f') the one or more electrical signals include one or more heterodyne components that oscillate at the gigahertz input signal frequency $v_{GHz}$ and include modulation that encodes at least one or more portions of the transmitted information.

Example 25. The apparatus of Example 24 wherein the detection system includes an electrical high-pass or band-pass filter arranged so as to preferentially transmit the one or more heterodyne components of the electrical signal relative to transmission of a non-oscillating component of the electrical signal.

Example 26. The apparatus of any one of Examples 24 or 25 further comprising a signal processing circuit structured and connected to as to receive at least modulated portions of the one or more heterodyne components of the electrical signal and produce therefrom one or more corresponding electrical output signals that encode at least portions of the transmitted information.

Example 27. The apparatus of any one of Examples 1 through 23 further comprising a signal processing system connected to the detection system, the signal processing system being structured and connected so as to receive the one or more electrical signals, demodulate the one or more electrical signals, and decode the transmitted information encoded by the modulation of the input signal.

Example 28. The apparatus of Example 27 wherein the signal processing system is arranged so as to decode the transmitted information encoded by the input signal according to an analog modulation scheme.

Example 29. The apparatus of Example 27 wherein the signal processing system is arranged so as to decode the transmitted information encoded by the input signal according to a digital modulation scheme.

Example 30. The apparatus of Example 27 wherein the signal processing system is arranged so as to decode the transmitted information encoded by the input signal according to a QAM modulation scheme, a PSK modulation scheme, or a PAM modulation scheme.

Example 31. The apparatus of any one of Examples 27 through 30 wherein the signal processing system is arranged so as to decode the transmitted information at a data rate greater than about 10 Gbps, greater than about 50 Gbps, greater than about 100 Gbps, greater than about 200 Gbps, or greater than about 500 Gbps.

Example 32. A method for using the apparatus of any one of Examples 1 through 31, the method comprising: (A) receiving the propagating input signal incident on the input beam combiner; (B) operating the upconverting laser source to produce the upconverting optical signal; and (C) generating the one or more electrical signals that include at least portions thereof that are modulated to encode the transmitted information.

Example 33. A method for using the apparatus of any one of Examples 20 through 23, the method comprising: (A) receiving the propagating input signal incident on the input beam combiner; (B) operating the upconverting laser source to produce the upconverting optical signal; (C) operating the local-oscillator laser source to produce the local-oscillator optical signal; and (D) generating the one or more electrical signals that include at least portions thereof that are modulated to encode the transmitted information.

Example 34. A method for using the apparatus of any one of Examples 24 through 26, the method comprising: (A) receiving the propagating input signal incident on the input beam combiner; (B) operating the upconverting laser source to produce the upconverting optical signal; and (C) generating the one or more electrical signals that include at least portions thereof that are modulated to encode the transmitted information.

Example 35. The method of any one of Examples 32 through 34, wherein (i) the apparatus further comprises a signal processing system connected to the detection system, the signal processing system being structured and connected so as to receive the one or more electrical signals, demodulate the one or more electrical signals, and decode the transmitted information encoded by the modulation of the input signal, and (ii) the method further comprises demodulating the one or more electrical signals, and decoding the transmitted information encoded by the modulation of the input signal.

Example 36. A method for using the apparatus of any one of Examples 26 through 31, the method comprising: (A) receiving the propagating input signal incident on the input beam combiner; (B) operating the upconverting laser source to produce the upconverting optical signal; (C) generating the one or more electrical signals that include at least portions thereof that are modulated to encode the transmitted information; and (D) demodulating the one or more electrical signals, and decoding the transmitted information encoded by the modulation of the input signal.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable subset of one or more features—which features are shown, described, or claimed in the present application—including those subsets that may not be explicitly disclosed herein. A "suitable" subset of features includes only features that are neither incompatible nor mutually exclusive with respect to any other feature of that subset. Accordingly, the appended claims are hereby incorporated into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The article "a" shall be interpreted as "one or more" unless "only one," "a single," or other similar limitation is stated explicitly or is implicit in the particular context; similarly, the article "the" shall be interpreted as "one or more of the" unless "only one of the," "a single one of the," or other similar limitation is stated explicitly or is implicit in the particular context. The conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. Similarly, "one or more of a dog or a cat" would be interpreted as including (i) one or more dogs without any cats, (ii) one or more cats without any dogs, or (iii) one or more dogs and one or more cats, unless explicitly stated otherwise or the alternatives are understood or disclosed (implicitly or explicitly) to be mutually exclusive or incompatible. Similarly, "one or more of a dog, a cat, or a mouse" would be interpreted as (i) one or more dogs without any cats or mice, (ii) one or more cats without and dogs or mice, (iii) one or more mice without any dogs or cats, (iv) one or more dogs and one or more cats without any mice, (v) one or more dogs and one or more mice without any cats, (vi) one or more cats and one or more mice without any dogs, or (vii) one or more dogs, one or more cats, and one or more mice. "Two or more of a dog, a cat, or a mouse" would be interpreted as (i) one or more dogs and one or more cats without any mice, (ii) one or more dogs and one or more mice without any cats, (iii) one or more cats and one or more mice without and dogs, or (iv) one or more dogs, one or more cats, and one or more mice; "three or more," "four or more," and so on would be analogously interpreted. For any of the preceding recitations, if any pairs or combinations of the included alternatives are understood or disclosed (implicitly or explicitly) to be incompatible or mutually exclusive, such pairs or combinations are understood to be excluded from the corresponding recitation. For purposes of the present disclosure and appended claims, the words "comprising," "including," "having," and variants thereof, wherever they appear, shall be construed as open ended terminology, with the same meaning as if a phrase such as "at least" were appended after each instance thereof, unless explicitly stated otherwise.

For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A millimeter-wave receiver apparatus comprising:
    (a) a continuous-wave upconverting laser source arranged so as to produce a linearly polarized upconverting optical signal characterized by an upconverting optical frequency $\nu_{OPT}$;
    (b) an input beam combiner that is positioned and arranged so as to combine the upconverting optical signal and a propagating input signal, each incident on the input beam combiner, to copropagate away from the input beam combiner, the input signal being (i) characterized by a gigahertz input signal frequency $\nu_{GHz}$ and (ii) modulated to encode transmitted information
    (c) a nonlinear optical medium positioned and arranged so that the combined upconverting optical signal and input signal copropagate through the nonlinear optical medium and generate therein one or more upconverted optical signals, at one or both sum or difference frequencies $\nu_{SUM}=\nu_{OPT}+\nu_{GHz}$ or $\nu_{DIFF}=\nu_{OPT}-\nu_{GHz}$, that copropagate with the upconverting optical signal and are linearly polarized substantially orthogonal to polarization of the upconverting optical signal;
    (d) a linear polarizer positioned and arranged so as to separate (i) propagation of the upconverting optical signal from (ii) propagation of the one or more upconverted optical signals;
    (e) a spectrally selective optical filter positioned and arranged so as to preferentially transmit at least one of the separated upconverted optical signals relative to transmission of a copropagating, residual portion of the upconverting optical signal that is linearly polarized substantially parallel to polarization of the upconverted optical signal; and
    (f) a detection system that includes one or more photodetectors and is positioned and arranged so as to (i) receive the upconverted optical signal transmitted by the optical filter and (ii) generate therefrom one or more electrical output signals that include at least portions thereof that are modulated to encode at least portions of the transmitted information.

2. The apparatus of claim 1 wherein the input beam combiner is structured and positioned so as to (i) reflect the upconverting optical signal incident on a first surface of the input beam combiner and (ii) transmit the propagating input signal incident on a second surface of the input beam combiner to copropagate with the reflected upconverting optical signal.

3. The apparatus of claim 1 wherein the input beam combiner comprises an off-axis reflector structured and positioned so as to (i) transmit the upconverting optical signal through a hole in the reflector and (ii) reflect the propagating input signal to copropagate with the upconverting optical signal.

4. The apparatus of claim 1 wherein the linear polarizer comprises a polarizing beamsplitter.

5. The apparatus of claim 1 wherein the gigahertz input signal frequency $\nu_{GHz}$ is between about $3.0 \times 10^{10}$ Hz and about $3.0 \times 10^{11}$ Hz.

6. The apparatus of claim 1 wherein the upconverting optical frequency $\nu_{OPT}$ is between about $7.5 \times 10^{13}$ Hz and about $7.5 \times 10^{14}$ Hz.

7. The apparatus of claim 1 wherein the upconverting laser source includes an optical isolator.

8. The apparatus of claim 1 wherein (i) the upconverting laser source includes a laser emitter and a laser polarizer arranged so that a linearly polarized portion of output of the laser emitter is transmitted by the laser polarizer as the upconverting optical signal, (ii) the linear polarizer is positioned and arranged so as to act as the laser polarizer, and (iii) the input beam combiner is arranged at substantially normal incidence with respect to the upconverting optical signal incident on the first surface.

9. The apparatus of claim 1 wherein the nonlinear optical medium includes a periodic medium arranged for quasi-phase-matched generation of the one or more upconverted optical signals.

10. The apparatus of claim 1 wherein the nonlinear optical medium includes a birefringent medium arranged for critical or non-critical birefringent-phase-matched generation of the one or more upconverted optical signals.

11. The apparatus of claim 1 wherein:
(a) the detection system includes a continuous-wave local-oscillator laser source arranged so as to produce a local-oscillator optical signal characterized by a local-oscillator optical frequency either $v_{LO}=v_{SUM}$ or $v_{LO}=v_{DIFF}$; and
(b) the detection system is arranged so as to (i) combine on one or more of the photodetectors corresponding portions of the local-oscillator optical signal and the received upconverted optical signal, and (ii) generate therefrom one or more corresponding electrical signals that include at least portions thereof that are modulated to encode the transmitted information.

12. The apparatus of claim 11 wherein the detection system includes a 90° phase shifter arranged so that (i) at least one photodetector receives a corresponding portion of the received upconverted optical signal combined with a corresponding phase-shifted portion of the local-oscillator optical signal, and (ii) at least one photodetector receives a corresponding portion of the received upconverted optical signal combined with a corresponding portion of the local-oscillator optical signal that is not phase shifted.

13. The apparatus of claim 11 wherein: (i) the upconverting laser source and the local-oscillator laser source are arranged so as to operate without phase locking therebetween, and the detection system is arranged to operate as an intradyne detection system.

14. The apparatus of claim 11 wherein: (i) the upconverting laser source and the local-oscillator laser source are coupled for phase-locked operation, and the detection system is arranged to operate as a homodyne detection system.

15. The apparatus of claim 1 wherein:
(d') the linear polarizer is positioned and arranged so as to direct the residual portion of the upconverting optical signal to copropagate with the one or more upconverted optical signals; and
(f') the one or more electrical signals include one or more heterodyne components that oscillate at the gigahertz input signal frequency $v_{GHz}$ and include modulation that encodes at least one or more portions of the transmitted information.

16. The apparatus of claim 15 wherein the detection system includes an electrical high-pass or bandpass filter arranged so as to preferentially transmit the one or more heterodyne components of the electrical signal relative to transmission of a non-oscillating component of the electrical signal.

17. The apparatus of claim 15 further comprising a signal processing circuit structured and connected to as to receive at least modulated portions of the one or more heterodyne components of the electrical signal and produce therefrom one or more corresponding electrical output signals that encode at least portions of the transmitted information.

18. The apparatus of claim 1 further comprising a signal processing system connected to the detection system, the signal processing system being structured and connected so as to receive the one or more electrical signals, demodulate the one or more electrical signals, and decode the transmitted information encoded by the modulation of the input signal.

19. The apparatus of claim 18 wherein the signal processing system is arranged so as to decode the transmitted information encoded by the input signal according to an analog modulation scheme, a digital modulation scheme, a QAM modulation scheme, a PSK modulation scheme, or a PAM modulation scheme.

20. The apparatus of claim 18 wherein the signal processing system is arranged so as to decode the transmitted information at a data rate greater than about 10 Gbps.

21. A method for using the apparatus of claim 1, the method comprising:
(A) receiving the propagating input signal incident on the input beam combiner;
(B) operating the upconverting laser source to produce the upconverting optical signal; and
(C) generating the one or more electrical signals that include at least portions thereof that are modulated to encode the transmitted information.

22. The method of claim 21, wherein (i) the apparatus further comprises a signal processing system connected to the detection system, the signal processing system being structured and connected so as to receive the one or more electrical signals, demodulate the one or more electrical signals, and decode the transmitted information encoded by the modulation of the input signal, and (ii) the method further comprises demodulating the one or more electrical signals, and decoding the transmitted information encoded by the modulation of the input signal.

23. A method for using the apparatus of claim 11, the method comprising:
(A) receiving the propagating input signal incident on the input beam combiner;
(B) operating the upconverting laser source to produce the upconverting optical signal;
(C) operating the local-oscillator laser source to produce the local-oscillator optical signal; and
(D) generating the one or more electrical signals that include at least portions thereof that are modulated to encode the transmitted information.

24. A method for using the apparatus of claim 15, the method comprising:
(A) receiving the propagating input signal incident on the input beam combiner;
(B) operating the upconverting laser source to produce the upconverting optical signal; and
(C) generating the one or more electrical signals that include at least portions thereof that are modulated to encode the transmitted information.

25. A method for using the apparatus of claim 18, the method comprising:
(A) receiving the propagating input signal incident on the input beam combiner;
(B) operating the upconverting laser source to produce the upconverting optical signal;
(C) generating the one or more electrical signals that include at least portions thereof that are modulated to encode the transmitted information; and
(D) demodulating the one or more electrical signals, and decoding the transmitted information encoded by the modulation of the input signal.

* * * * *